(12) United States Patent
Wang et al.

(10) Patent No.: US 9,778,048 B2
(45) Date of Patent: Oct. 3, 2017

(54) METHOD AND APPARATUS FOR DETERMINING REACHABLE AREA BASED ON ROAD NETWORK

(71) Applicant: Baidu Online Network Technology (Beijing) Co., Ltd, Beijing (CN)

(72) Inventors: Feng Wang, Beijing (CN); Zhitang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 12 days.

(21) Appl. No.: 14/585,065

(22) Filed: Dec. 29, 2014

(65) Prior Publication Data

US 2015/0369616 A1    Dec. 24, 2015

(30) Foreign Application Priority Data

Jun. 18, 2014    (CN) .......................... 2014 1 0271484

(51) Int. Cl.
*G01C 21/34* (2006.01)
*G01C 21/36* (2006.01)

(52) U.S. Cl.
CPC ......... *G01C 21/34* (2013.01); *G01C 21/3697* (2013.01)

(58) Field of Classification Search
USPC ........................................................ 701/410
See application file for complete search history.

(56) References Cited

U.S. PATENT DOCUMENTS

2003/0109266 A1* 6/2003 Rafiah ................ G01C 21/3423
455/456.1

| | | | |
|---|---|---|---|
| 2009/0271105 A1 | 10/2009 | Kindo et al. | |
| 2013/0096818 A1* | 4/2013 | Vicharelli .......... | G01C 21/3469 701/423 |
| 2013/0311089 A1* | 11/2013 | Freed ................. | G01C 21/3423 701/533 |
| 2014/0372031 A1* | 12/2014 | Canner ................ | G01C 21/206 701/533 |
| 2015/0149078 A1* | 5/2015 | Profous .............. | G01C 21/3446 701/426 |
| 2015/0354968 A1* | 12/2015 | Mizuno ................ | G09B 29/106 701/534 |

FOREIGN PATENT DOCUMENTS

WO    WO 2014/001565 A1    1/2014

OTHER PUBLICATIONS

Extended European Search Report, EP Application No. 14200494.4, dated Nov. 17, 2015.
Communication pursuant to Article 94(3) EPC, Application No. 14 200 494.4, dated Dec. 22, 2016.

* cited by examiner

*Primary Examiner* — Shelley Chen
(74) *Attorney, Agent, or Firm* — Orrick, Herrington & Sutcliffe, LLP

(57) ABSTRACT

A method and apparatus for determining a reachable area based on a road network are provided. The method comprises: acquiring a current location of a user and a road network map; generating a road node map based on the road network map; searching on the road node map for a boundary point extending for a maximum travel distance starting from the current location of the user along a road; and determining a reachable area based on the searched boundary point.

20 Claims, 3 Drawing Sheets

METHOD AND APPARATUS FOR DETERMINING REACHABLE AREA BASED ON ROAD NETWORK

CROSS-REFERENCE TO RELATED APPLICATIONS

The present application claims priority to Chinese Patent Application No. CN201410271484.3, filed on Jun. 18, 2014, the entire disclosure of which is incorporated herein by reference in its entirety and for all purposes.

TECHNICAL FIELD

The present invention relates to the field of location services, and more particularly to a method and apparatus for determining a reachable area based on a road network.

BACKGROUND

A location based service (LBS) is used for acquiring geographical location information about a terminal device and providing relevant information services for a user according to the acquired geographical location information. When information services are provided, peripheral retrieval is a very important service. For example, various map applications (APPs) may provide peripheral point of interest (POI) information according the geographical location where a terminal device is located, thereby helping a user to use the terminal device to inquire about the locations of a restaurant, a cinema, common facilities, etc. within a predetermined range surrounding the location. As another example, in taxi paging software, the need to send a paging request to a terminal device in a taxi within a predetermined range based on a location where a user is located.

For the sake of the factors of inquiry efficiency and stability, the existing manner for calculating a reachable area widely uses a concentric circle or a rectangle as a reachable range of a user. That is to say, when services of peripheral retrieval, etc. are carried out, a concentric circle or a view display area serves as a result filtering condition. The existing practices actually assume that a user has various isotropic moving abilities as if on a uniform surface which is infinitely large; however, actually, a moving policy of the user is often moving along a road network, and the distance moved after leaving the road network will not be too far, and therefore, an actual reachable area of the user should be a buffer area of a path on which the user may extend. Another problem in the existing practices is not considering the influence of landforms which can not be crossed by a user, such as a closed area, a water area or a mountain, on the user reachable area; however, road network-based reachable area analysis may avoid similar problems to some extent.

However, the calculation efficiency of the existing method for calculating a reachable area based on a road network is not high, and the calculation cost is higher than that of the method for calculating a reachable area based on concentric circles or grids. Sample statistics in the Beijing area show that time spent on inquiries based on a road network of over 2.3 km may exceed 500 ms; therefore, the aspect of efficiency of the manner for calculating a reachable area based on a road network still needs to be improved.

SUMMARY

One aspect of the present invention provides a method for determining a reachable area based on a road network, comprising: acquiring a current location of a user and a road network map; generating a road node map based on the road network map; searching on the road node map for a boundary point extending for a maximum travel distance starting from the current location of the user along a road; and determining a reachable area based on the searched boundary point.

According to one aspect of the present invention, a road node is an end point of a road.

According to one aspect of the present invention, the step of searching on the road node map for a boundary point extending for a maximum travel distance starting from the current location of the user along a road comprises: searching for a road node surrounding the current location of the user; checking the shortest path from the searched road node to the current location of the user; and when the length of the shortest path from the searched road node to the current location of the user is longer than the maximum travel distance, determining a boundary point of the reachable area on the shortest path.

According to one aspect of the present invention, the step of searching for a road node surrounding the current location of the user comprises: firstly searching for a road node of a road closest to the current location of the user.

According to one aspect of the present invention, the step of searching on the road node map for a boundary point extending for a maximum travel distance starting from the current location of a user along a road comprises: when the length of the shortest path from the searched road node to the current location of the user is shorter than the maximum travel distance, searching for a road node which is adjacent to the road node and has not been accessed, and checking the length of the shortest path from the road node that has not been accessed to the current location of the user.

According to one aspect of the present invention, the step of determining a reachable area comprises: determining the area within a convex polygon formed by connecting the searched boundary points as being the reachable area.

According to another aspect of the present invention, an apparatus for determining a reachable area based on a road network is provided, comprising: a location information acquisition unit, for acquiring current location information; a road node map unit, for generating and storing road node map data; and a controller, for acquiring current location information about a user from the location information acquisition unit, acquiring a road node map from the road node map unit, searching on the road node map for a boundary point extending for a maximum travel distance starting from the current location of the user along a road, and determining a reachable area based on the searched boundary point.

According to another aspect of the present invention, the road node map unit generates road node map data based on pre-stored map data, or receives the road node map data from the outside.

According to another aspect of the present invention, the controller searches for a road node surrounding the current location of the user, and checks the shortest path from the searched road node to the current location of the user, wherein when the length of the shortest path from the searched road node to the current location of the user is longer than the maximum travel distance, the controller determines a boundary point of the reachable area on the shortest path.

According to another aspect of the present invention, when the length of the shortest path from the searched road node to the current location of the user is shorter than the maximum travel distance, the controller searches for a road node which is adjacent to the road node and has not been accessed, and checks the length of the shortest path from the road node that has not been accessed to the current location of the user.

According to another aspect of the present invention, the controller determines the area within a convex polygon formed by connecting the searched boundary points as being the reachable area.

BRIEF DESCRIPTION OF THE ACCOMPANYING DRAWINGS

The above and other objects and characteristics of the present invention will be more apparent from the following description in conjunction with the accompanying drawings, in which.

DETAILED DESCRIPTION OF THE PREFERRED EMBODIMENTS

The description with reference to the accompanying drawings is provided below to assist in a comprehensive understanding of exemplary embodiments of the present invention as defined by the claims and their equivalents. In the description, unless explicitly specified, the same variable has the same definition. The description comprises various specific details to assist in understanding, but this description will merely be considered as exemplary. Therefore, those of ordinary skill in the art will appreciate that various changes and modifications as described herein may be made without departing from the scope and spirit of the present invention. In addition, the description regarding well-known functions and constructions may be omitted for clarity and conciseness.

Figure 1:
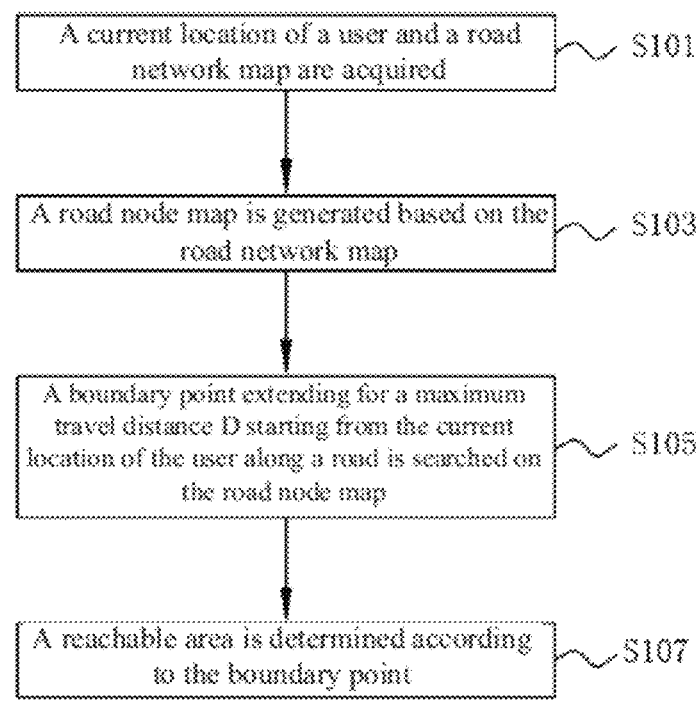
FIG. 1 is a flowchart illustrating a method for determining a reachable area based on a road network according to the embodiments of the present invention.

FIG. 1 is a flowchart illustrating a method for determining a reachable area based on a road network according to the embodiments of the present invention.

As shown in FIG. 1, firstly, in step S101, a current location of a user and a road network map are acquired. Here, a user may carry an apparatus with a positioning function, for example, a mobile phone, a navigator, etc. with a GPS positioning function. In this way, the current location of the user may be acquired by means of the apparatus with a positioning function, and a road network map within a predetermined range surrounding the current location is obtained. The road network map may be map data pre-stored in the mobile phone or the navigator, and may also be acquired from the outside. For example, the mobile phone may be used to download the road network map from a server by connecting to the Internet through a cellular network connection.

Next, in step S103, a road node map is generated based on the road network map. The road node map is a topology diagram generated based on roads in the road network map. The road node map will be described in detail later with reference to FIG. 2. Here, the roads in the road network map are connected among road nodes. The road nodes are end points on roads, and usually these end points are end points of the roads, i.e. a crossing, such as a crossroad, a T-junction and the like. Certainly, the end points may also be terminating points of the roads. The user may be located at any location on the roads in the road network, and may also be located at any location on map areas divided by the roads.

Then, in step S105, a boundary point extending for a maximum travel distance D starting from the current location of the user along a road is started to be searched from the current location of the user. Here, assuming that the moving speed of the user is uniform, then within a predetermined time, a reachable area of the user is within the range of the distance to the current location of the user as the maximum travel distance D (for example, 1 kilometer). Specifically, the farthest reached boundary point on a reachable road is obtained by extending the maximum travel distance D to a surrounding area on a road based on the current location of the user. In the present invention, based on the current location of the user, an initial road node of a road corresponding to the location thereof is obtained, and a road node surrounding the initial road node is further searched starting from the initial road node, and the shortest path from the searched road node to the current location of the user is calculated. If it is found that the shortest path from a road node to the current location of the user exceeds D, then the farthest reached boundary point of the reachable area may be determined on the shortest path.

Finally, in step S107, the reachable area is determined according to the boundary point determined in step S105. Here, if at least two farthest reached boundary points exist, then the reachable area may be formed according to the current location of the user and the at least two farthest reached boundary points.

The process for calculating a reachable area on a road node map by extending the maximum travel distance D based on a road node will be described in detail with reference to FIG. 2(a)-FIG. 2(e).

Figure 2A:
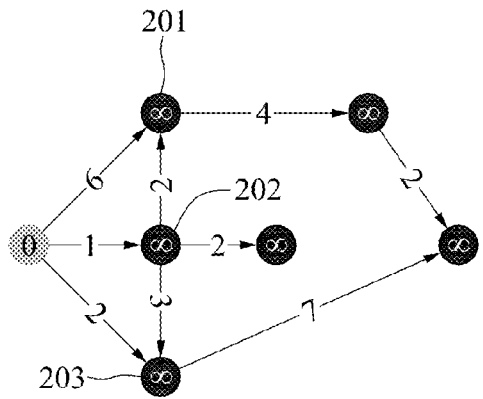
FIG. 2(a) is a schematic node diagram illustrating a process for calculating a reachable area according to an embodiment of the present invention.
Figure 2B:
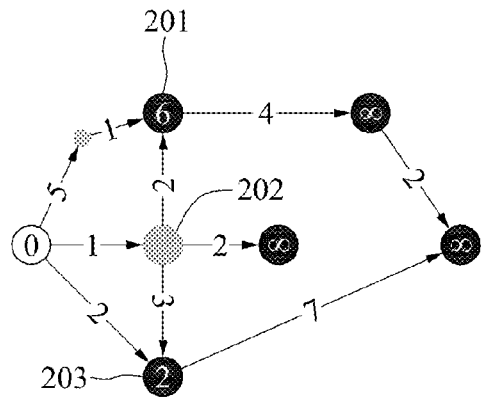
FIG. 2(b) is a schematic node diagram illustrating a process for calculating a reachable area according to an alternative embodiment of the present invention.
Figure 2C:
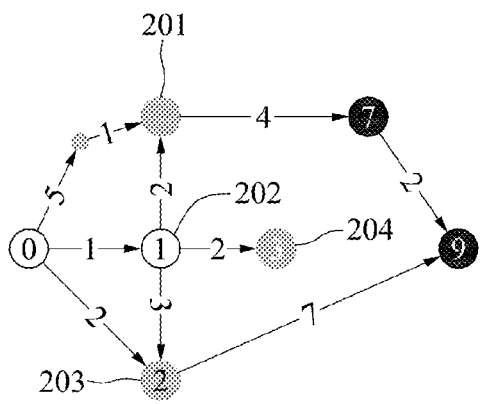
FIG. 2(c) is a schematic node diagram illustrating a process for calculating a reachable area according to another alternative embodiment of the present invention.
Figure 2D:
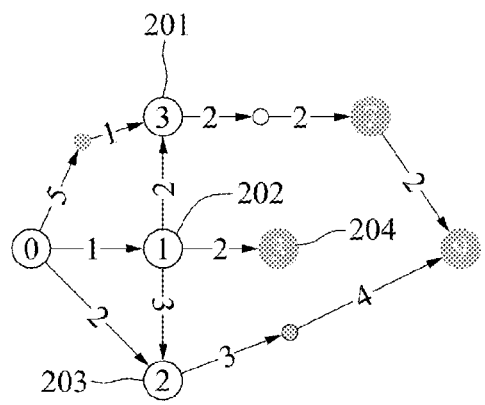
FIG. 2(d) is a schematic node diagram illustrating a process for calculating a reachable area according to another alternative embodiment of the present invention.
Figure 2E:
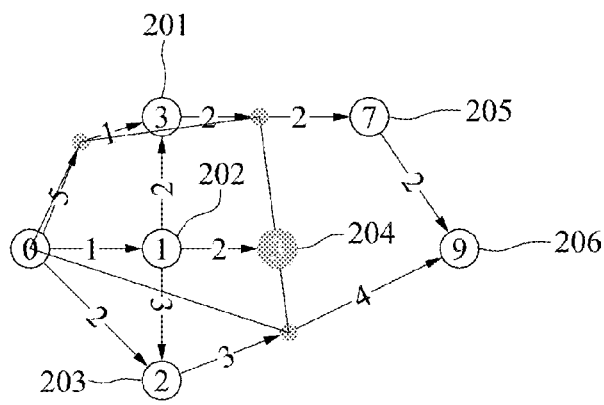
FIG. 2(e) is a schematic node diagram illustrating a process for calculating a reachable area according to another alternative of the present invention.

Firstly, as shown in FIG. 2(a), assuming that a current location of a user is at a road node 0, while 3 road nodes 201, 202 and 203 exist near the road node 0, and the distances between the road node 0 and the road nodes 201, 202 and 203 are respectively 6, 1 and 2 units. The road node 0 will be referred to as an initial road node below. Based on the initial road node, an adjacent road node list comprising adjacent road nodes 201, 202 and 203 directly connected to the road node 0 may be generated. Whether the distance between each adjacent road node in the adjacent road node list and the initial road node is longer than the maximum travel distance D may be successively determined.

Figure 3:
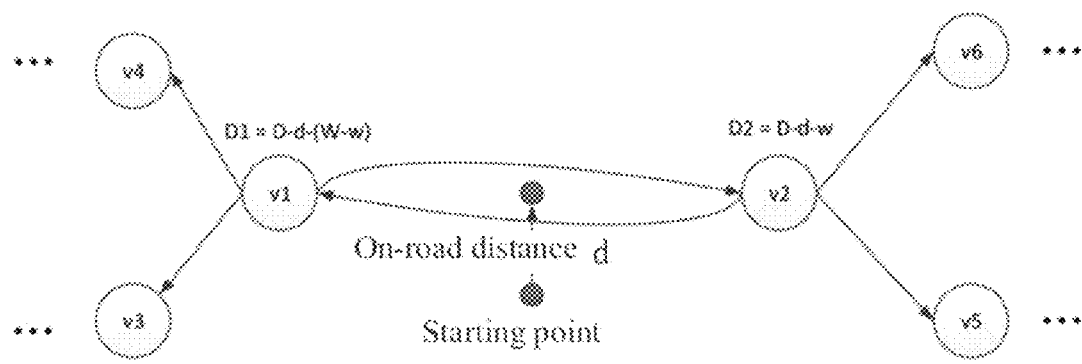
FIG. 3 is a schematic diagram illustrating determining an initial road node in the process of calculating a reachable area according to the embodiments of the present invention.

The case where the current location of the user overlaps with a road node is taken into consideration above. However, in actual conditions, the current location of the user is likely not located at the road node, and also likely not located on a road of the road network, and therefore, the initial road node may be determined as shown in FIG. 3. Specifically, as shown in FIG. 3, the nearest distance (i.e. an on-road distance) between the current location (i.e. a starting point) of the user and the closest road is assumed as d, while the distances between an on-road point and two nodes v1 and v2 of the road are respectively W-w and w, assuming that W-w and w are both shorter than the maximum travel distance D. In this way, initial road nodes v1 and v2 may be obtained in two directions, and accordingly, at the initial road node v1, when a reachable area is calculated, the maximum travel distance used thereby is D1=D-d-(W-w), while at the initial road node v2, when the reachable area is calculated, the maximum travel distance used thereby is D2=D-d-w. As shown in FIG. 3, two adjacent road nodes v3 and v4 exist in the initial road node v1, while two adjacent road nodes v5 and v6 exist in the initial road node v2. In this way, the process of extending the maximum travel distance D to a road node surrounding the current location based on the current location of the user so as to calculate the reachable area in step S105 may be converted into a bi-initial road node extending process.

In the following, referring back to FIG. 2(*b*), after the adjacent road node list of the initial road node is generated, whether the distance between each adjacent road node in the adjacent road node list and the initial road node is longer than the maximum travel distance D is determined With regard to an adjacent road node with a distance longer than the maximum travel distance D, a location with the distance D on the road before the initial road node and the adjacent road node may be determined as a boundary point of the reachable area. Then, an adjacent road node with the distance to the initial road node 0 being shorter than the maximum travel distance D may serve as an intermediate node, and an adjacent road node of the intermediate node is searched and the above extending process is repeated, until the distances between all the subsequently searched adjacent road nodes and the initial road node all exceed the maximum travel distance D.

Specifically, in FIG. 2(*b*), whether the distances between the road nodes 201, 202 and 203 and the initial road node 0 are longer than D is determined Here, it is assumed that D=5. It can be seen from FIG. 2(*b*) that the distance between the node 201 and the initial road node 0 is 6, and since the distance is longer than the maximum travel distance, a point a on the road between the node 0 and the node 201 is determined as being a boundary point of the reachable area. Being different from the node 201, the distance between the node 202 and the initial road node 0 is 1, which is shorter than the maximum travel distance 5, and therefore, the node 202 is set as an accessed intermediate node so as to continue to use the node in subsequent extending calculations, and meanwhile, the distance 1 between the node 202 and the initial road node 0 is recorded in an intermediate node list. Likewise, the distance between the node 203 and the initial road node 0 is 2, which is likewise shorter than the maximum travel distance 5; therefore, the node 203 is set as an accessed intermediate node, and the node 203 and the corresponding distance 2 are recorded in the intermediate node list.

Next, an adjacent road node of the road node in the intermediate node list is obtained so as to update the adjacent road node list, and whether the distance from the initial road node to a road node in adjacent list nodes through a road node in the intermediate node list exceeds the maximum travel distance D is determined. As shown in FIG. 2(*c*), adjacent road nodes of the node 202 located in the intermediate node list comprise nodes 201, 203 and 204. The distance to the node 201 through the node 202 is 1+2=3, and the distance is shorter than the maximum travel distance 5; therefore, the node 201 is put into the intermediate node list, and the node 201 is set as having been accessed, and meanwhile, the distance 3 is recorded as the distance from the node 201 to the initial road node 0. The distance to the node 204 through the node 202 is 1+2=3<5; therefore, the node 204 is set as having been accessed, and is put into the intermediate node list and the corresponding distance 3 is recorded. The distance to the node 203 through the node 202 is 1+3=4<5, but since the node 203 has been in the intermediate node list and the intermediate node list has recorded that the distance from the initial road node 0 to the node 203 is 2, i.e., the shortest path distance from the initial road node 0 to the node 203 is 2, there is no need to update the distance from the node 203 to the initial road node 0.

Next, as shown in FIG. 2(*d*), whether an adjacent road node which has not been accessed exists in the nodes in the intermediate node list is determined according to a similar manner as described above with reference to FIG. 2(*c*), and the process is repeated until all the adjacent road nodes of the nodes in the intermediate node list have been accessed. For example, in FIG. 2(*d*), a node 205 in adjacent road nodes 205 and 202 of the node 201 is not accessed, and whether the distance from the initial road node 0 to the node 205 through the node 202 exceeds the maximum travel distance is determined. Here, since the distance from the node 202 to the node 205 is 4, the distance from the initial road node 0 to the node 205 through the node 202 is 1+2+4=7, which is longer than the maximum travel distance 5; therefore, a point b with the distance being 2 on the road from the node 202 to the node 205 is determined as being a boundary point of the reachable area. Likewise, the distance from the node 203 to an adjacent road node 206 is 7, while the minimum distance from the initial road node 0 to the node 203 is 2; therefore, a point c on the road from the node 203 to the node 206 may be determined as being a boundary point of the reachable area. However, with regard to the node 204, since there is no adjacent road node except the road node 202 which has been accessed, the node 204 per se is determined as being a boundary point of the reachable area. In this way, after all the nodes in the intermediate node list have been accessed, the boundary points a, b, c and 204 of the reachable area may finally be obtained.

At last, as shown in FIG. 2(*e*), a convex polygon is formed by connecting the initial road node 0 and the boundary points a, b, c and 204, and it can be seen that the area in the convex polygon is the final reachable area.

It should be understood that the above is merely a manner for calculating the farthest reached boundary point by extending along a road to an adjacent road node, and other algorithms may also be used to calculate the farthest reached point.

An apparatus 400 for determining a reachable area based on a road network according to the embodiments of the present invention will be described below with reference to FIG. 4.

Figure 4:
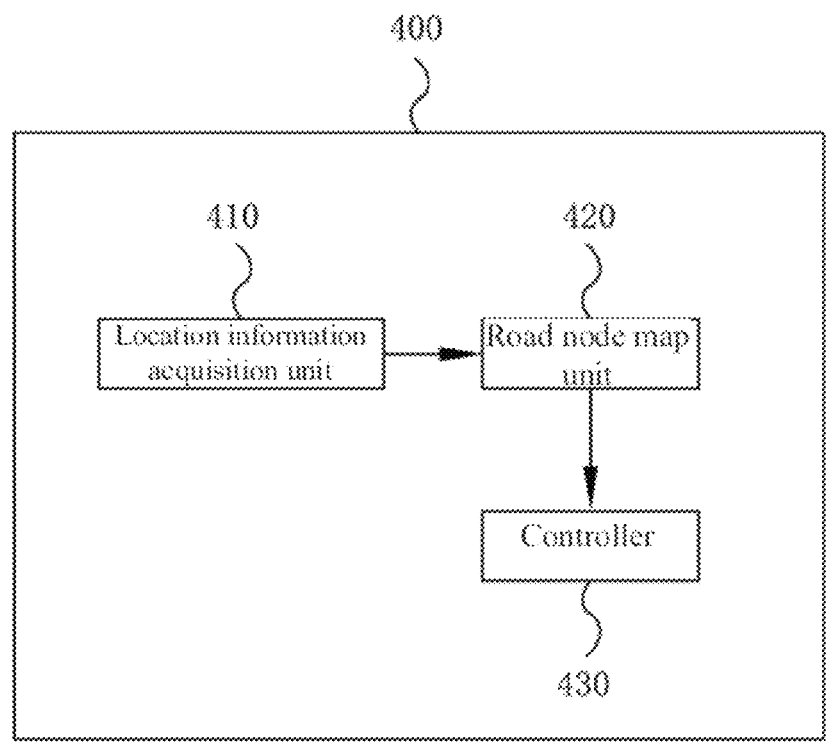
FIG. 4 is a schematic diagram illustrating an apparatus for determining a reachable area based on a road network according to the embodiments of the present invention.

As shown in FIG. 4, the apparatus 400 comprises a location information acquisition unit 410, a road node map unit 420 and a controller 430.

The location information acquisition unit 410 is used for acquiring current location information about the apparatus 400. The road node map unit 420 is used for generating and storing road node map data. Here, the road node map unit 420 may generate the road node map data based on prestored map data, and may also receive the road node map data from the outside through a communication unit (not shown).

The controller 430 acquires current location information about a user from the location information acquisition unit 410, acquires a road node map from the road node map unit 420, searches on the road node map for a boundary point extending for a maximum travel distance starting from the current location of the user along a road, and determines a reachable area based on the searched boundary point.

Here, the controller 430 extends the maximum travel distance along the road on the acquired road node map based on the current location of the user so as to obtain a boundary point of the reachable area. The controller 430 may search for a road node connected to a road closest to a user based on the current location of the user, and checks the shortest path from the searched road node to the current location of the user. When the length of the shortest path from the searched road node to the current location of the user is longer than the maximum travel distance, the controller 430 may determine a boundary point of the reachable area on the shortest path. When the length of the shortest path from the searched road node to the current location of the user is shorter than the maximum travel distance, the controller 430 continues to search for a road node which is adjacent to the road node and has not been accessed, and checks the length of the shortest path from the road node that has not been accessed to the current location of the user. The above searching and checking processes are repeatedly executed until the distances of the shortest paths from the searched new road nodes that have not been accessed to the current location of the user all exceed the maximum travel distance. At this moment, the controller 430 determines a final reachable area according to at least one boundary point obtained in the above process. Particularly, if at least two boundary points exist, then the controller 430 may determine the area within a convex polygon formed by connecting the searched boundary points as the reachable area according to the current location of the user and the at least two boundary points.

The reachable area determination method according to the present invention takes the current location of a user and road connection conditions in a road network into consideration so as to better adapt to vehicle traffic characteristics and facilitate implementing subsequent services based on the reachable area. For example, the reachable area determination manner of the present invention may be applied to taxi calling software so as to be able to push a taxi calling request, within a determined reachable area, to all taxies within the area based on the current location of the user. In this way, the taxi calling request may be pushed more effectively and more accurately.

The method according to the present invention may be recorded in a computer readable medium including program instructions executing various operations implemented by a computer. The medium may also merely include program instructions or include data files, data structures, etc. combined with the program instructions. Examples of the computer readable medium include a magnetic medium (for example, a hard disk, a floppy disk and a magnetic tape), an optical medium (for example, a CD-ROM and a DVD), a magneto-optical medium (for example, an optical disk), and a hardware apparatus particularly configured for storing and executing program instructions (for example, a read-only memory (ROM), a random access memory (RAM), a flash memory, etc.). The medium may also be a transmission medium including a carrier for transmitting signals of stipulated program instructions, data structures, etc. (for example, an optical line or a metal line, waveguide, etc.). Examples of the program instructions include, for example, machine codes produced by a compiler, and a file containing high-level codes that may be executed by a computer using an interpreter.

Although the present invention has been specifically shown and described with reference to exemplary embodiments of the present invention, it shall be understood by those skilled in the art that various changes in the form and details may be made thereto without departing from the spirit and scope of the present invention as defined by the claims.

What is claimed is:

1. A method for determining a reachable area based on a road network, comprising:

acquiring a location along a road and a road network map;

generating a road node map based on the road network map;

searching the road node map for a boundary point extending for a maximum travel distance starting from the acquired location, the boundary point including a selected point on a road between two adjacent road nodes exclusive on the road node map upon determining that one of the two adjacent road nodes extends beyond the maximum travel distance from the acquired location; and determining the reachable area based on the boundary point.

2. The method of claim 1, wherein said generating the road node map includes generating the road node map with a road node representing an end point of the road.

3. The method of claim 1, wherein said searching the road node map comprises: searching for a road node surrounding the acquired location; checking a shortest path from the searched road node to the acquired location;

ascertaining whether a length of a shortest path from the searched road node to the acquired location is longer than the maximum travel distance; and identifying a boundary point of the reachable area on the shortest path based upon said ascertaining.

4. The method of claim 1, wherein said searching the road node map comprises:

initially searching for two initial road nodes on a road that is closest to the acquired location upon determining that the acquired location does not overlap with a road node on the road node map, the two initial road nodes including a first initial road node and a second initial road node;

searching the road node map for a boundary point extending for a first distance D1 starting from the first initial road node; and searching the road node map for a boundary point extending for a second distance D2 starting from the second initial road node, wherein D1=D−d−(W−w) and D2=D−d−w, D being the maximum travel distance, d being a nearest distance between the acquired location and the closest road, and W−w and w being respective distances from the first initial road node and the second initial road node to an on-road point of the acquired location on the closest road.

5. The method of claim 3, wherein said searching the road node map comprises: ascertaining whether a length of a shortest path from the searched road node to the acquired location is shorter than the maximum travel distance; and based upon said ascertaining whether the length of the shortest path from the searched road node to the acquired location is shorter than the maximum travel distance,
searching for a road node that is adjacent to the searched road node and that has not been accessed; and
checking a length of a shortest path from the adjacent road node to the acquired location.

6. The method of claim 1,
wherein said searching the road node map for the boundary point includes searching a plurality of boundary points of the road node map, and
wherein said determining the reachable area comprises determining an area within a convex polygon formed by connecting the searched boundary points.

7. The method of claim 1, wherein said acquiring the location includes acquiring a current location of a user.

8. An apparatus for determining a reachable area based on a road network, comprising:
a location information acquisition unit for acquiring information about a current location;
a road node map unit for generating a road node map based on the road network; and
a controller for:
searching the road node map for a boundary point extending for a maximum travel distance starting from the current location along a road, the boundary point including a selected point on a road between two adjacent road nodes exclusive on the road node map upon determining that one of the two adjacent road nodes extends beyond the maximum travel distance from the acquired location; and
determining a reachable area based on the searched boundary point.

9. The apparatus of claim 8, wherein the road node map includes a road node representing an end point of the road.

10. The apparatus of claim 8, wherein said road node map unit generates the road node map based on pre-stored map data.

11. The apparatus of claim 8, wherein said road node map unit generates the road node map based on road node map data received from a remote source.

12. The apparatus of claim 8, wherein said controller searches is configured for: searching for a road node surrounding the current location;
checking a shortest path from the searched road node to the current location;
ascertaining whether a length of a shortest path from the searched road node to the current location is longer than the maximum travel distance; and
identifying a boundary point of the reachable area on the shortest path based upon said ascertaining.

13. The apparatus of claim 12, wherein said controller searches is configured for: ascertaining whether a length of a shortest path from the searched road node to the current location is shorter than the maximum travel distance; and
based upon said ascertaining whether the length of the shortest path from the searched road node to the current location is shorter than the maximum travel distance, searching for a road node that is adjacent to the searched road node and that has not been accessed; and
checking a length of a shortest path from the adjacent road node to the current location.

14. The apparatus of claim 8, wherein said controller searches is configured for: searching a plurality of boundary points of the road node map; and
determining an area within a convex polygon formed by connecting the searched boundary points.

15. A non-transitory computer storage medium including at least one program for determining a reachable area based on a road network when implemented by a processor, comprising:
instruction for acquiring a location along a road and a road network map; instruction for generating a road node map based on the road network map; instruction for searching the road node map for a boundary point extending for a maximum travel distance starting from the acquired location, the boundary point including a selected point on a road between two adjacent road nodes exclusive on the road node map upon determining that one of the two adjacent road nodes extends beyond the maximum travel distance from the acquired location; and
instruction for determining the reachable area based on the boundary point.

16. The computer storage medium of claim 15, wherein said instruction for generating the road node map includes instruction for generating the road node map with a road node representing an end point of the road.

17. The computer storage medium of claim 15, wherein said instruction for searching the road node map comprises:
instruction for searching for a road node surrounding the acquired location;
instruction for checking a shortest path from the searched road node to the acquired location;
instruction for ascertaining whether a length of a shortest path from the searched road node to the acquired location is longer than the maximum travel distance; and
instruction for identifying a boundary point of the reachable area on the shortest path based upon said ascertaining.

18. The computer storage medium of claim 17, wherein said instruction for searching for the road node comprises instruction for initially searching for a road node of a road closest to the acquired location.

19. The computer storage medium of claim 17, wherein said instruction for searching the road node map comprises:
instruction for ascertaining whether a length of a shortest path from the searched road node to the acquired location is shorter than the maximum travel distance;
instruction for searching for a road node that is adjacent to the searched road node and that has not been accessed; and
instruction for checking a length of a shortest path from the adjacent road node to the acquired location,
wherein said instruction for searching for the road node and said instruction for checking the length of the shortest path being are upon a result of said instruction for ascertaining whether the length of the shortest path from the searched road node to the acquired location is shorter than the maximum travel distance.

20. The computer storage medium of claim 15,
wherein said instruction for searching the road node map for the boundary point includes instruction for searching a plurality of boundary points of the road node map, and
wherein said instruction for determining the reachable area comprises instruction for determining an area within a convex polygon formed by connecting the searched boundary points.

* * * * *